(12) United States Patent
Shiell (10) Patent No.: US 6,212,601 B1
(45) Date of Patent: Apr. 3, 2001

(54) MICROPROCESSOR SYSTEM WITH BLOCK MOVE CIRCUIT DISPOSED BETWEEN CACHE CIRCUITS

(75) Inventor: Jonathan H. Shiell, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/920,379

(22) Filed: Aug. 29, 1997

(51) Int. Cl.$^7$ ..................................................... G06F 12/00
(52) U.S. Cl. ........................ 711/118; 711/125; 711/169; 711/212; 711/219; 712/210; 712/225
(58) Field of Search .................................. 711/118, 127, 711/128, 125, 137, 140, 141, 219, 212, 169; 712/32, 204, 206, 207, 225, 210

(56) References Cited

U.S. PATENT DOCUMENTS

| | | | |
|---|---|---|---|
| 4,344,130 | * 8/1982 | Fung et al. | 395/200.42 |
| 4,736,293 | * 4/1988 | Patrick | 711/128 |
| 4,920,483 | * 4/1990 | Pogue et al. | 711/219 |
| 4,991,133 | * 2/1991 | Davis et al. | 395/200.64 |
| 5,475,824 | * 12/1995 | Grochowski et al. | 395/382 |
| 5,481,689 | * 1/1996 | Stamm et al. | 711/202 |
| 5,611,071 | * 3/1997 | Martinez, Jr. | 711/133 |
| 5,721,855 | * 2/1998 | Hinton et al. | 395/394 |
| 5,765,181 | * 6/1998 | Oberlin et al. | 711/5 |
| 5,809,320 | * 9/1998 | Jain et al. | 712/34 |
| 5,819,059 | * 10/1998 | Tran | 712/213 |

* cited by examiner

Primary Examiner—John W. Cabeca
Assistant Examiner—Pierre-Michel Bataille
(74) Attorney, Agent, or Firm—Robert D. Marshall, Jr.; W. James Brady, III; Frederick J. Telecky, Jr.

(57) ABSTRACT

In one embodiment, there is a single integrated circuit microprocessor (10). The microprocessor has an instruction pipeline (12) which comprises an execution stage (12a) operable to process an information unit of a first length. The microprocessor further includes a cache circuit (20) comprising a memory (34) operable to store a transfer unit of information of a second length and accessible by the instruction pipeline. The second length corresponding to the capability of the cache circuit is greater than the first length corresponding to the execution stage operability. Lastly, the microprocessor includes a block move circuit (24) coupled to the cache circuit and operable to read/write a transfer unit of information of the first length into the memory of the cache circuit.

11 Claims, 5 Drawing Sheets

TABLE 1

| SOURCE | NUMBER OF ROTATIONS FOR DESTINATION SA0 | MM3:MM0 (CYCLE 1) | MM3:MM0 (CYCLE 2) |
|---|---|---|---|
| SA0 | 00 | 1111 | -- |
| SA1 | 01 | 0111 | 1000 |
| SA2 | 10 | 0011 | 1100 |
| SA3 | 11 | 0001 | 1110 |

MICROPROCESSOR SYSTEM WITH BLOCK MOVE CIRCUIT DISPOSED BETWEEN CACHE CIRCUITS

TECHNICAL FIELD OF THE INVENTION

The present embodiments relate to microprocessor systems, and are more particularly directed to a microprocessor system with a block move circuit disposed between one or more levels of cache circuits.

BACKGROUND OF THE INVENTION

Microprocessor technology continues to advance at a rapid pace, with consideration given to all aspects of design. Designers constantly strive to increase performance, while maximizing efficiency. With respect to performance, greater overall microprocessor speed is achieved by improving the speed of various related and unrelated microprocessor circuits and operations. For example, one area in which operational efficiency is improved is by providing parallel and out-of-order instruction execution. As another example, operational efficiency also is improved by providing faster and greater capability to move information, with such information including instructions and/or data. The present embodiments are primarily directed at this latter capability.

Movement of information to a destination is desirable in many instances. As a first example of moving information to a destination, there is the instance where information is moved (or copied) from a memory source location(s) to a memory destination location(s). As a specific example, page management in a paged memory system moves information, such as in a copy-on-write scenario. In this scenario, often various programs share the same copy of information; however, when one of the sharing programs desires to write to the shared version of the information, a copy of that information is made and dedicated to the writing program. In making the copy, therefore, information is copied from a source address to a destination address. As a second example of moving information to a destination, there is the instance of a block clear. Again, in the context of a paged system, such a clear may occur where it is desirable to allocate a page in memory for a program. As another example, for security reasons often an area in memory will need to be cleared before it can be accessed by another program. Therefore, the operating system (or other controlling resource) will write over (i.e., clear) the relevant page frames before granting a different program access to that area in memory.

Many information movement techniques cost a considerable amount of processing time. This is not so much due to the frequency of the operations as to the size of the information moved. For example, in a paged system such as described above, often blocks on the order of 4K or larger are being moved. Indeed, the same size blocks also may be cleared and such an operation is often far more frequent than moving data from a source to a destination. In any event, these actions are quite common and burden the processor resources.

Due to the prevalence of information moves, some architectures have included instructions which are directed to such actions. For example, in the INTEL 80x86 system, there are included the REP MOVS and REP STOS instructions for moving information from a source to a destination or storing a fixed value to a destination, respectively. As another example, IBM mainframe techniques have included the MVCL instruction which can either move information from a source to a destination, or store fixed values to a destination. Indeed, IBM further includes the MOVPG instruction which moves pages as well as providing other functionality. In all events, processing of these instructions presents a burden on the system, and may be handled according to the particular architecture, a few of which are discussed below.

Movement of information (i.e., either data or instruction) within a computer system is contemplated in all sorts of architectures, from mainframe computer systems to single integrated circuit microprocessors. When information is moved within a computer system, it is typically desirable to move as large a block of such information as possible. For example, bus widths continue to increase toward this end. As another example, various approaches have been attempted in computer architecture to create circuits which are either exclusively dedicated or partially dedicated to move blocks of informnation. These approaches, however, often have certain drawbacks.

One approach to moving blocks of information is to include a dedicated and autonomous circuit to operate independent of the central processing unit ("CPU"). Because of its autonomy, the dedicated circuit permits a block move while the CPU is performing other operations. However, such hardware is often very complex, such as requiring address calculation and block length considerations. Thus, while performance may be improved, a cost necessarily comes with the improvement. Moreover, such approaches are known to be included only in large systems and are normally associated with a centralized storage controller which does not exist in smaller systems. Indeed, such approaches may be implemented using a separate processor to perform the block move operations. Therefore, this approach is not immediately applicable to single integrated circuit microprocessor systems.

Another approach to moving blocks of information is to include a dedicated block move circuit at the level of the execution units of a microprocessor. While this technique has been used within a single integrated circuit microprocessor system, it is also suffers drawbacks. For example, the execution units will operate having access to some baseline bus width, such as an eight byte bus width under current technology. Because the dedicated block move circuit is at the same level as the execution units, it necessarily is constrained to the baseline bus width. Thus, while it may move blocks of information independent of other execution units, it can only move a block up to the size of the baseline bus level. Thus, in the example immediately above, such a circuit could only move eight bytes at a time. As a result, if a cache having a line width of 32 bytes is being filled by such a technique, then each line takes at least four write cycles to write a 32 byte line (i.e., 4 cycles*8 bytes/cycle=32 byte line). Consequently, where it is known that a block to be moved is much larger than eight bytes, the advantage provided by the dedicated block move circuit is less than if it were operable to move a larger quantity in a single write cycle.

In view of the above, the present inventor addresses the drawbacks of certain prior block move circuits by providing various embodiments, as demonstrated below.

SUMMARY OF THE INVENTION

In one embodiment, there is a single integrated circuit microprocessor. The microprocessor has an instruction pipeline which comprises an execution stage operable to process an information unit of a first length. The microprocessor further includes a cache circuit comprising a memory operable to store a transfer unit of information of a second length and accessible by the instruction pipeline. The second length corresponding to the capability of the cache circuit is greater than the first length corresponding to the execution stage operability. Lastly, the microprocessor includes a block move circuit coupled to the cache circuit and operable to read/write a transfer unit of information of the first length into the memory of the cache circuit. Other circuits, systems, and methods are also disclosed and claimed.

DETAILED DESCRIPTION OF THE PREFERRED EMBODIMENTS

Figure 1:
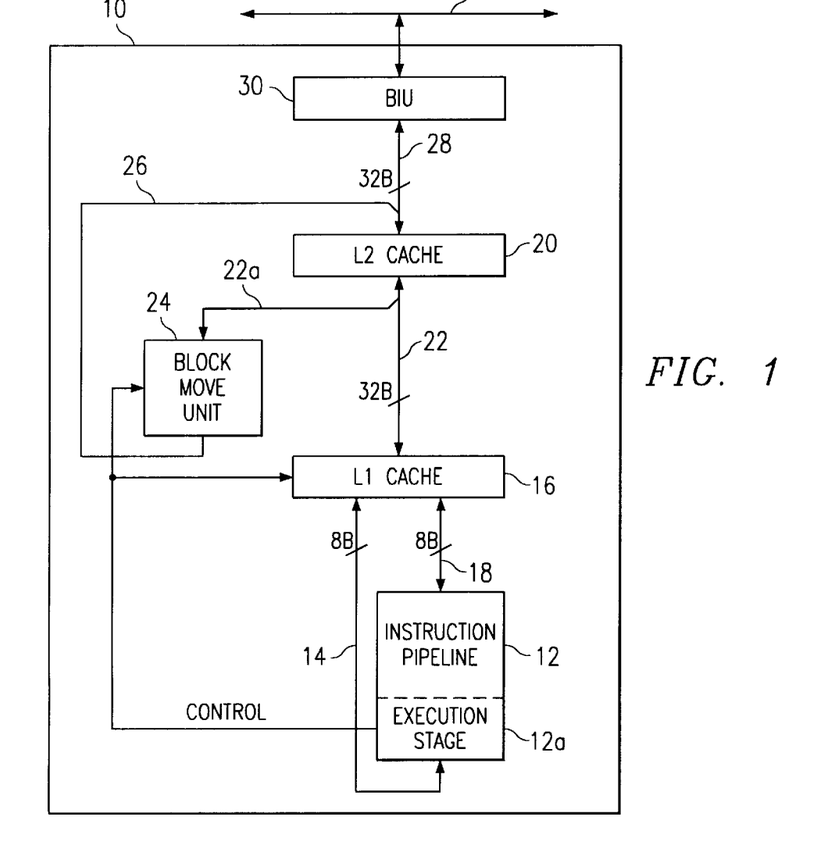
FIG. 1 illustrates a block diagram of a single integrated circuit microprocessor having at least a first and second cache circuit, with a block move unit coupled to move a transfer unit of information to a destination into the second cache circuit.

FIG. 1 illustrates a block diagram of a microprocessor 10 in accordance with the present embodiments. Microprocessor 10 may be of various types of microprocessor structures, and an example of one such structure is detailed below in connection with FIG. 9. At this point, however, various details related to such a microprocessor are neither shown nor explained in order to simplify the present discussion. Instead, such a discussion is deferred until the detailed discussion of FIG. 9, below.

Turning to the blocks shown in FIG. 1, microprocessor 10 includes an instruction pipeline 12, which is intended to depict at a minimum the capabilities which either fetch information from, or provide information to, some higher level of memory storage which is either internal to, or external from, microprocessor 10. With respect to pipeline 12, it is known in current microprocessor design that it may include various stages such as, by way of example, an instruction fetch stage, decode stages, a schedule or issue stage, an execution stage, and a graduate/writeback stage. The specific stages are not critical for the present embodiments, but an execution stage 12a is shown for reasons more evident below. Execution stage 12a represents the various types of units known to execute an instruction once it is received and prepared for execution. For example, execution stage 12a may include various units such as a load store unit, an arithmetic logic unit, and a floating point unit. Moreover, multiple ones of any such unit also may be included in execution stage 12a. For purposes of the present embodiment, however, only two aspects need be noted at this point with respect to execution stage 12a. First, execution stage 12a includes at least one load/store unit to provide various control signals described later (shown as CONTROL on FIG. 1). Second, execution stage 12a communicates information along an internal bus 14 which represents an illustrative width for bus communications at the level of instruction pipeline 12. Thus, bus 14 represents a reference point, referred to in this document as a bus baseline, for the largest size of information which may be communicated at the execution stage of processing. For example, in current microprocessor technology, bus 14 is typically on the order of eight bytes wide and, therefore, is shown as such in FIG. 1. Other sizes and variations are known in the art, with it understood that the current example and illustration are intended only to depict a bus baseline reference for reasons more clear later. In all events, during an execution operation, execution stage 12a may communicate (i.e., either read or write) using bus 14, and that communication will be up to eight bytes wide.

Figure 9:
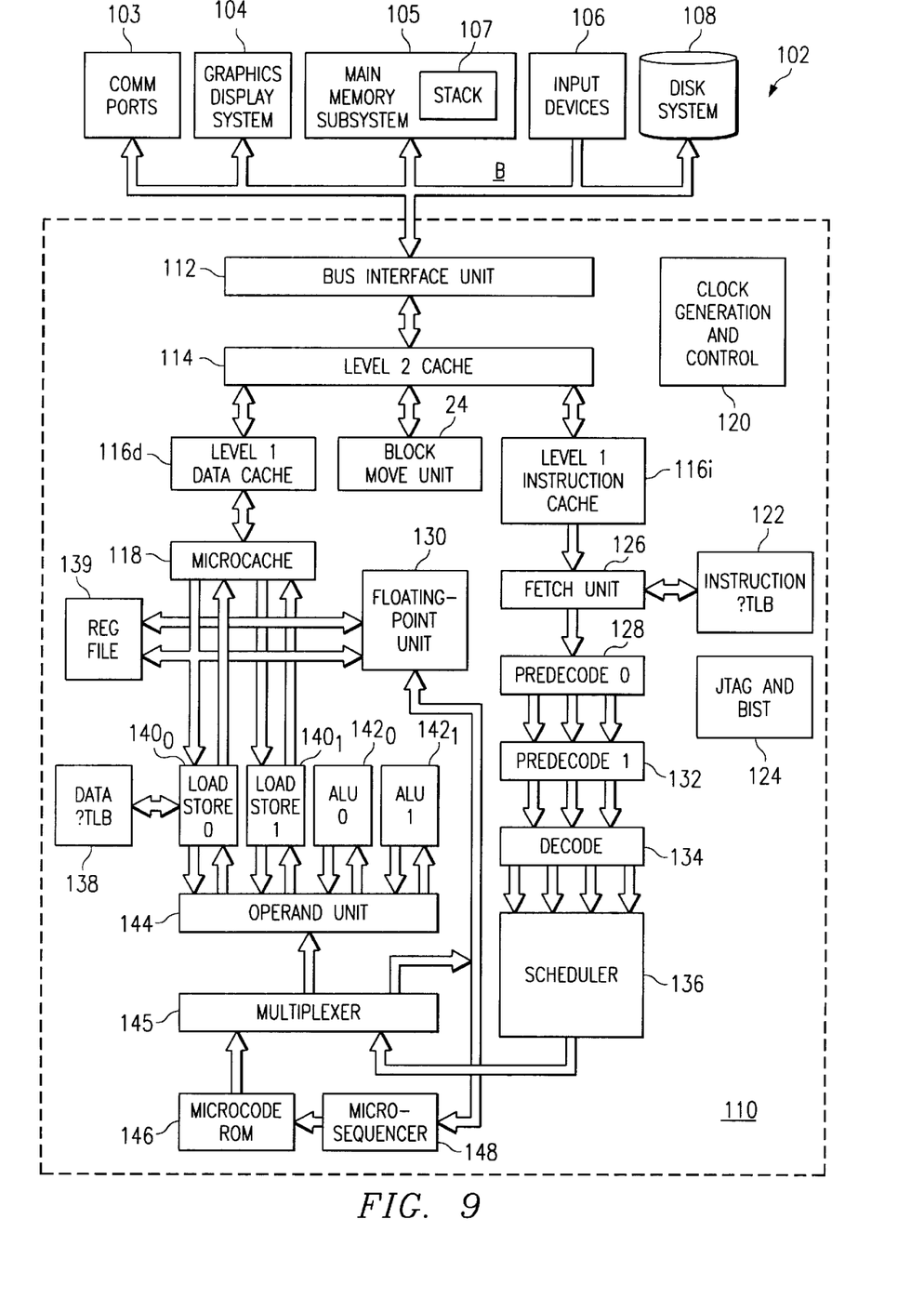
FIG. 9 illustrates an exemplary data processing system within which the preferred embodiments may be implemented.

Microprocessor 10 further includes a first level cache circuit, shown in FIG. 1 as L1 cache 16. The "L1" indication demonstrates a matter of memory hierarchy as is known in the art. In other words, cache circuits with a lower numerical designation are commonly closer to execution stage 12a as compared to cache circuits with a higher numerical designation, such as the L2 cache discussed later. Moreover, the numerical designation of the cache provides an ascending indication of the order in which the caches are accessed by instruction pipeline 12 when it is either reading or writing information. Thus, such an access first occurs to an L1 cache and, if a cache miss occurs to that cache, it is followed by an access to an L2 cache, and so forth through the memory hierarchy until a hit is found in either a cache or other memory structure. Returning to L1 cache 16, in the present embodiment it preferably is operable to store 256 groups of information and, for purposes of this document, these groups are referred to as "transfer units". This term is used to indicate a group of information which may be transferred (i.e., either read or written) by the cache in a single write cycle. In the present embodiment, each transfer unit of L1 cache 16 contains 32 bytes of either data or instruction information. Note further, however, that while L1 cache 16 is shown as a single structure to thereby store both data and instruction information, in an alternative embodiment (such as shown in FIG. 9, discussed below) L1 cache 16 may be separated into two separate structures which are at the same hierarchy level in the memory system, but where one structure stores data information while the other structure stores instruction information. Moreover, L1 cache 16 is connected to instruction pipeline 12 via bus 14, as well as via a second bus 18. As mentioned above, bus 14 communicates with execution stage 12a and, at this point, it therefore may be appreciated that execution stage 12a may communicate via bus 14 to (or through) L1 cache circuit 16 for instruction execution. With respect to bus 18, in the preferred embodiment it, like bus 14, is also eight bytes wide by way of example. Since each transfer unit of L1 cache 16 is 32 bytes wide, L1 cache 16 necessarily includes selection circuitry (not shown) such as a multiplexing function so as to output only eight bytes of those 32 bytes at a time to bus 18. Moreover, bus 18 permits instruction pipeline 12 to fetch instructions from L1 cache 16.

Microprocessor 10 further includes an additional cache, namely, L2 cache 20. Again, the "L2" designation necessarily indicates that this cache is higher in the memory hierarchy as compared to L1 cache 16 (and any other storage below L1 cache 16 as well). In the present embodiment, L2 cache 20 preferably is a sub-blocked cache, where each line of the cache is separated into two sub-blocks, and each sub-block stores a transfer unit as that term is introduced above. More particularly, each line of L2 cache 20 stores 64 bytes of information which is separated into two sub-blocks each storing a corresponding transfer unit; thus, each sub-block stores a 32 byte transfer unit of information. Moreover, each 32 byte of information also has stored in L2 cache 20 an associated group of control information (e.g., MESI information, etc.) so that, for a given line within L2 cache 20, each of the two transfer units may be separately used; for example, invalidating one transfer unit in a line does not necessarily invalidate the other. Sub-blocked caches in this regard are known in the art. Given this structure, L2 cache 20 is operable to store 2048 lines (i.e., 4096 transfer units) of information. Additionally, because of its larger size, L2 is slower to access than is L1. In any event, L2 cache 20 is connected to L1 cache by way of a bus 22, which is 32 bytes wide. Thus, L2 cache 20 can transfer 32 bytes along bus 22 per cycle.

Information output by L2 cache 20 is further connected to the input of a block move unit 24 as shown by a split of bus 22 to a bus indicated at 22a. The output of block move unit 24 is connected to a bus 26 which is also 32 bytes wide. Bus 26 connects into a bus 28 which is connected to the input of L2 cache 20. The detailed circuitry and operability provided by block move unit 24 is set forth below in connection with FIGS. 3 through 6. At this point, however, note that the operations of block move unit 24 may be separated generally into two techniques, both of which write blocks of information to L2 cache 20, and with these operations under control of the CONTROL signals from execution stage 12a. In each technique, block move unit 24 writes an entire transfer unit of information (i.e., 32 bytes) to a destination within L2 cache 20 in a single write cycle. In a first of the techniques (e.g., FIGS. 5, 6, and 8), the source of the information written to L2 cache 20 is the output of L2 cache 20 and, therefore, in this instance, block move unit 24 moves a transfer unit of information from a source address of L2 cache 20 to a destination address in L2 cache 20. In a second of the techniques (e.g., FIG. 7), the source of the information written to L2 cache 20 is a predetermined pattern of bits, such as all zeroes in the instance where it is desired to clear-to-zero a transfer unit in L2 cache 20; therefore, in this latter instance, block move unit 24 moves a transfer unit (e.g., the pattern of all zeroes) to a destination address in L2 cache 20. Given the two techniques of block move unit 24, note in both that 32 bytes may be moved at a time by the unit and, therefore, it permits considerably larger bandwidth than the eight byte limit imposed by the bus baseline at the level of execution stage 12a.

To conclude the description of FIG. 1, note further that bus 28 is further connected to a bus interface unit ("BIU") 30 that is connected to a bus B. Bus B extends external from microprocessor 10 and, therefore, may control and perform communication between microprocessor 10 and other elements external from microprocessor 10, including an external memory which would be higher in the memory hierarchy than L2 cache 20 (and, of course, also higher than L1 cache 16 as well). At this point, any additional elements external from microprocessor 10 are not detailed for sake of simplicity, with examples of such elements deferred until the discussion of FIG. 9, below.

Figure 2:
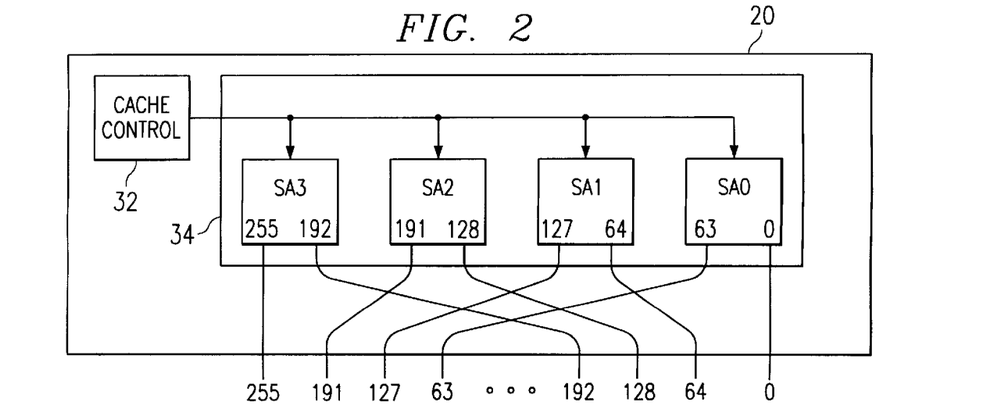
FIG. 2 illustrates a block diagram of the four storage areas of the second cache circuit of FIG. 1.

FIG. 2 illustrates a diagram of the logical orientation of L2 cache 20 of FIG. 1. L2 cache 20 includes a control circuit 32, as well as a memory designated generally at 34. Control circuit 32 is included to depict known functionality which may be included in a cache circuit to accomplish various cache-related techniques, such as address tag checking, implementation of standards such as MESI, as well as others well known in the art. More pertinent to the remaining discussion, however, note that memory 34 is logically addressed as including four equal sized storage areas designated S0, S1, S2, and S3. In other words, the physical orientation of the storage areas is not particularly pertinent, but logically they are addressed as four different areas. Moreover, as mentioned above, a sub-block of L2 cache 20 stores 32 bytes. As a result, the address of each of the four different storage areas may be represented as the following n+1 bits:

$$x_n x_{n-1} x_{n-2} \ldots B_4 B_3\ 000$$

In other words, the states of B4 and B3 select any one of the four storage areas. Given the four separate storage areas, therefore, each is operable in a single write cycle to output eight bytes of information (again, either data or instruction), with the combination of the four storage areas providing a total of 32 bytes of information. Of further note, however, is that the output leads of the four storage areas are interleaved, or "folded" as often referred to in the art. Such a construction is beneficial for purposes of improving layout efficiencies. However, as a result, if the input/output pins of all storage areas are perceived in a single dimension (such as horizontally across the page in FIG. 2), note that the actual output presented by memory 34 as a whole is not in sequential order. Instead, every fourth bit represents an output from a single storage area. Thus, the level of interleaving defines the ordering of each bit (e.g., every four bits). This out-of-order sequence is set forth here to better appreciate how it is accommodated by the embodiments described below.

Figure 3:
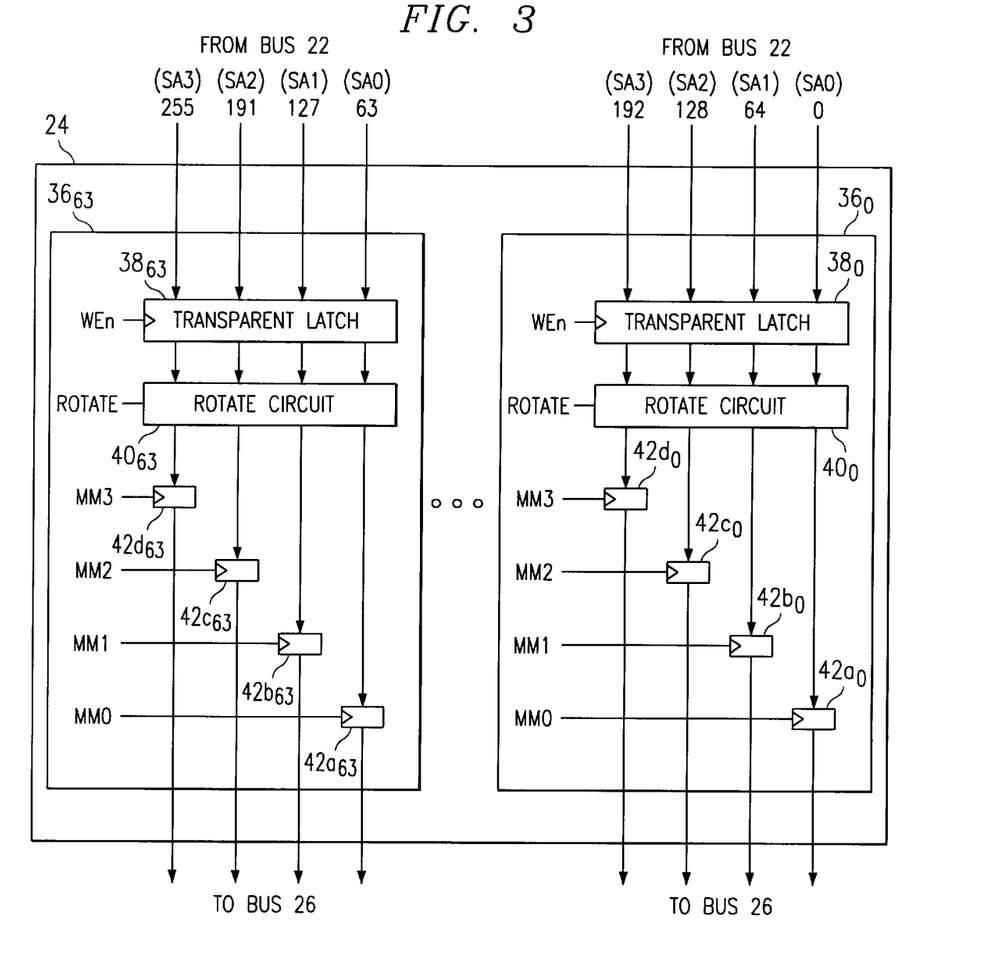
FIG. 3 illustrates a schematic of the block move circuit shown in FIG. 1.

FIG. 3 illustrates a schematic of block move unit 24 from FIG. 1, yet in greater detail. Specifically, recall from FIG. 1 that L2 cache 20 outputs a total of 256 bits (i.e., 32 bytes) to block move unit 24; moreover, from FIG. 2, it is now appreciated that those bits are ordered in four bit groups, where each bit from the group of four bits is output by a respective one of four different storage areas. Given this layout of information, one skilled in the art will appreciate that L2 cache 20 outputs a total of sixty-four, four bit groups to block move unit 24. To simplify FIG. 3, however, only the least significant and most significant groups of four bits are shown at the top of the figure, with it understood that the remaining groups are likewise received by circuitry which duplicates that shown in FIG. 3. Turning then to the circuitry of FIG. 3, each four bit group is connected to an information alignment circuit designated generally at 36. The information alignment circuit corresponding to the least significant group of four bits is further distinguished by adding the subscript "0" to its general designation of 36, while the most significant group of four bits is further distinguished by adding the subscript "63" to its general designation of 36. Again, therefore, it should be understood that circuit 36 is duplicated sixty-four times, with the additional sixty-two duplicate circuits (i.e., circuits $36_1$ through $36_{62}$) not shown to simplify the illustration.

Each information alignment circuit 36 is constructed in the same manner, with the only distinction being that each receives different information at its inputs and, therefore, operates to output different information as well. Therefore, to simplify the current explanation, the following discussion is directed to information alignment circuit $36_0$ (i.e., the circuit for the least significant four bit group) with it understood that the same construction and operation applies to the remaining information alignment circuits as well. Note further that the "0" subscript is used for the remaining components of circuit $36_0$, again merely to suggest that those circuits are included within circuit $36_0$ whereas like circuits are included in the remaining information alignment circuits. Information alignment circuit $36_0$ includes a four bit transparent latch $38_0$ connected to the four inputs of information alignment circuit $36_0$. In the preferred embodiment, transparent latch $38_0$ is such a device so that, when desired, it may merely pass data through it directly to the circuit connected to its outputs or, alternatively, may receive a write enable signal (abbreviated "WEn" in FIG. 3) so as to retain a copy of the information passed through it for certain cases based on information alignment as more clear below. In the preferred embodiment, his write enable signal is part of the CONTROL signal received from the load/store unit of execution stage 12a (recall, stage 12a is shown in FIG. 1). The four bit output of transparent latch $38_0$ is connected to the input of a rotate circuit $40_0$. As detailed below, in response to a two bit rotate control signal (shown as ROTATE in FIG. 3), which is also preferably part of the CONTROL signal, rotate circuit $40_0$ is operable to rotate the four bits within it from zero to three locations. In the preferred embodiment, the rotation direction is to the right. Each bit of the four bit output of rotate circuit $40_0$ is connected to a corresponding latch $42a_0$ through $42d_0$ (or some other comparable storage device). Each of these latches is separately operable to latch its input information in response to a write enable signal and, for purposes explained below, the write enable signal is referred to as a merge mask signal (as explained later) and is abbreviated as MM0, MM1, MM2, and MM3, for latches $42a_0$, $42b_0$, $42c_0$, and $42d_0$, respectively. The merge mask signal is also preferably part of the CONTROL signal provided by execution stage 12a to block move unit 24.

The operation of information alignment circuit $36_0$ (and therefore the similarly constructed and operating circuits $36_1$ through $36_{63}$ as well) is understood with reference to FIGS. 4 through 6 discussed below. As an introductory statement, however, the operation of the entire set of information alignment circuits 36 should be appreciated to receive a transfer unit of information (i.e., 32 bytes) and either output that information in the same alignment as received, or to re-align it as shown below. More specifically, note that a 32 byte transfer unit is read from L2 cache 20 and received at the inputs of each set of information alignment circuits 36 in response to an address. In the present embodiment, that address preferably addresses the beginning of an 8 byte unit in any of storage areas SA0 through SA3. As stated in the art, therefore, the address is said to be "aligned" to either SA0, SA1, SA2, or SA3. In other words, given the address format set forth above, alignment to each of SA0, SA1, SA2, or SA3 may be represented as follows:

| Storage Area | Address |
| --- | --- |
| SA0 | $X_n X_{n-1} X_{n-2} \cdots 0\ 0\ 0\ 0\ 0$ |
| SA1 | $X_n X_{n-1} X_{n-2} \cdots 0\ 1\ 0\ 0\ 0$ |
| SA2 | $X_n X_{n-1} X_{n-2} \cdots 1\ 0\ 0\ 0\ 0$ |
| SA3 | $X_n X_{n-1} X_{n-2} \cdots 1\ 1\ 0\ 0\ 0$ |

Once an aligned 32 byte transfer unit of information is received, information alignment circuit $36_0$ is then operable to re-align that transfer unit of information such that when it is output to L2 cache 20, it is aligned to a destination address, where that destination address is aligned to one of storage areas SA0 through SA3. This re-alignment occurs in response to the CONTROL signals received from execution stage 12a. As an arbitrary example, a transfer unit received in response to an address aligned to SA2 may re-align to a different address which is aligned to SA0. Examples of such techniques are given below.

Figure 4:
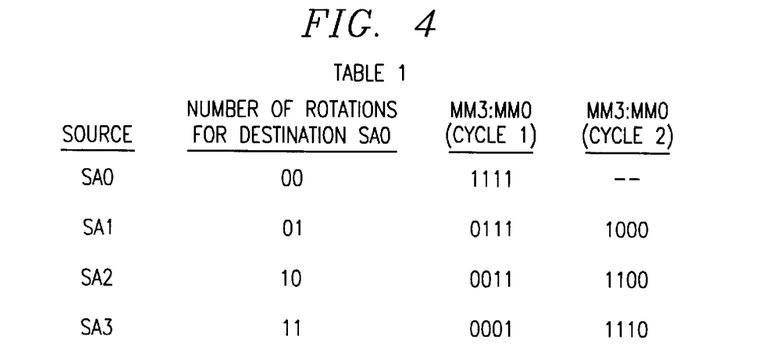
FIG. 4 illustrates a Table for the control signals for operation of the block move circuit shown in FIG. 3 to re-align information aligned to any of the four storage areas shown in FIG. 2 to a destination address aligned to the first of the four storage areas shown in FIG. 2.

FIG. 4 illustrates a Table 1 providing the CONTROL signals for information alignment circuit $36_0$ based on a destination alignment to storage area SA0 and for all possible source alignments (i.e., SA0 through SA3). Note that the information in Table 1 may be stored by various techniques on microprocessor 10, such as in a look-up table or the like as is known in the art. As another alternative, note that the information in Table 1 also may be dynamically calculated rather than stored in a storage device. In any event, the control signals of Table 1 provide sufficient control such that if a transfer unit is received by block move circuit 24 which has a source address originally aligned to any of SA1, SA2, or SA3, it may then be re-aligned in response to those control signals and then output to a destination address which begins a transfer unit starting at SA0. In addition, Table 1 also provides control signals where both the source and destination address align to SA0 (as shown in the first row of Table 1). Turning then to the second row of Table 1, it provides an example where re-alignment occurs from a source address aligned to SA1 to a destination address is aligned to SA0 as indicated by the first column of that row. Based on the source address, the second column of the second row indicates in binary form the number of right rotations to be performed by rotate circuit $40_0$, that is, the two bit ROTATE binary signal applied to rotate circuit $40_0$ as shown in FIG. 3. In the current example, the second column of the second row indicates that one right rotation is appropriate. Continuing along the second row, the third and fourth column indicate the merge mask to be applied to latches $42a_0$ through $42d_0$ in two separate cycles, as better appreciated below. At then end of those separate cycles, the transfer unit including the information at the source address at SA1 is then re-aligned and may be re-written to L2 cache 20 but to commence at a destination address aligned to SA0. The remaining rows of Table 1 depict alternative values to be evaluated in a similar manner, and which are better appreciated given the following discussion of FIG. 5 as well as an illustrative example.

Figure 5:
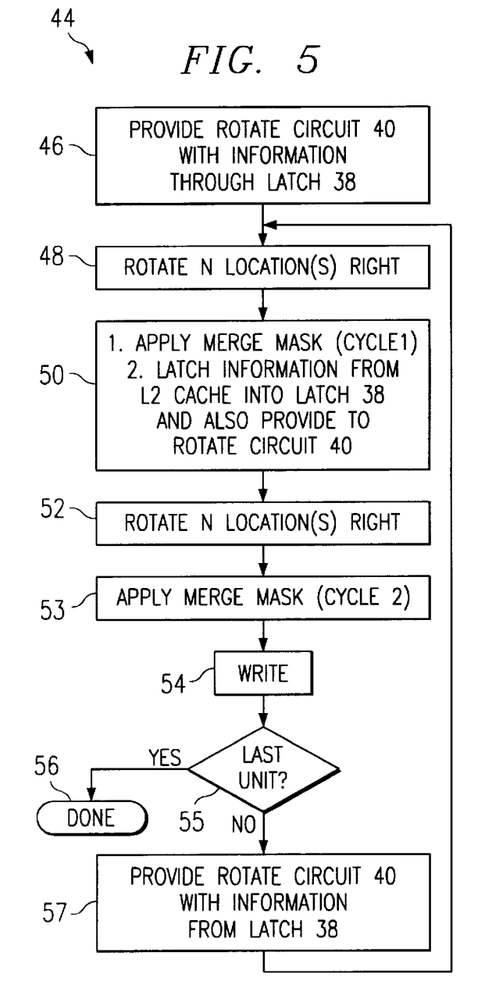
FIG. 5 illustrates a flowchart of the method steps for moving and re-aligning information from a source address aligned from any one of the four storage areas shown in FIG. 2 to a destination address aligned to the first of the four storage areas.

FIG. 5 illustrates a flowchart of a method designated generally at 44 and for demonstrating the operation of the information alignment circuits 36 of FIG. 3. Method 44 begins with step 46, where L2 cache 20 has output a transfer unit of information and, therefore, it is available at the inputs to block move unit 24. Note also at this point that the addressing of L2 cache 20 to provide this transfer unit of information may be performed according to various known techniques, the specifics of which are not pertinent. In any event, the transfer unit of information is available at the circuit inputs and step 46 causes the corresponding four bit portion of that transfer unit to be provided through transparent latch $38_0$ to rotate circuit 40. Returning briefly to FIG. 3, therefore, step 46 may be accomplished by de-asserting the WEn control signal connected to transparent latch $38_0$ such that the information is not latched by that device but, instead, merely passes through to rotate circuit 40. Additionally, this same de-asserted WEn signal is connected to all similar transparent latches $38_1$ through $38_{63}$ and, therefore, each of those latches also passes through a corresponding four bit portion of the transfer unit of information to a corresponding rotate circuit $40_1$ through $40_{63}$.

Before proceeding with the remaining steps of FIG. 5, it is helpful to establish a convention by way of example so as to demonstrate how bits are re-aligned in the present embodiments. Therefore, in the context of information alignment circuit $36_0$, consider that its four inputs receive four bits of information as shown below, with a capital letter used for each bit so as to distinguish it from other bits and to demonstrate its order in the received sequence:

| Input: | 192 (S3) | 128 (S2) | 64 (S1) | 0 (SA0) |
|---|---|---|---|---|
| Bit received: | D | C | B | A |

In addition, assume as an example that the above information was output by L2 cache 20 as part of a transfer unit of information, and that it is desired to re-align that information so that the information which currently begins at S1 is now realigned to a destination address which aligns to the beginning of S0. This example is therefore carried through the remaining steps of method 44 in a step by step manner, and is then repeated in a single table by way of summarization.

Step 48 rotates the bits received in step 46, with the amount of rotation indicated in the Table 1 based on the alignment of the source address. In the current example, recall that the source address aligned to S1 and is to be re-aligned to an address aligned to S0. Consequently, the second row of Table 1 indicates that one rotation is appropriate. Thus, step 48 rotates the received bits one position to the right, such that after step 48 those bits appear in the following order in rotate circuit $40_0$:

| As received: | D | C | B | A |
|---|---|---|---|---|
| After rotate: | A | D | C | B |

In addition to the above, the same ROTATE signal is connected to all similar rotate circuits $40_1$ through $40_{63}$ and, therefore, each of those rotate circuits also rotates a corresponding four bit portion of the transfer unit of information.

Step 50 includes two actions. First, the MM0 through MM3 merge masks are applied a first time to latches $42a_0$ through $42d_0$. In this first instance, these control bits effectively permit some of these bits to pass through the latches, while others may be masked from passing through the latches. Returning then to Table 1, for the current example of source SA1 and destination SA0, MM3:MM0 equals 0111. Therefore, latch $42d_0$ does not latch the bit at its input while each of latches $42c_0$, $42b_0$, and $42a_0$ latches the bit at its respective input. Consequently, the output of the four latches after the first operation of step 50 is:

| After mask: | — | D | C | B |
|---|---|---|---|---|

A second operation also occurs in step 50, and may occur concurrently with the first step 50 operation set forth above. Specifically, step 50 also latches into transparent latch $38_0$ the next four bit quantity from the transfer unit of L2 cache 20 following the immediately preceding addressed transfer unit. In this event, therefore, WEn is asserted so that latch 38 latches the information in addition to providing it to rotate circuit 40. Continuing with the present example, assume then that the inputs as received are as follows from this next transfer unit:

| Input: | 192 (S3) | 128 (S2) | 64 (S1) | 0 (SA0) |
|---|---|---|---|---|
| Bit received: | H | G | F | E |

Step 52 rotates and stores the bits at its input, with the amount of rotation equaling that used in step 48. In the present example (of a move from S1 alignment to S0 alignment), recall that the proper amount of right rotation is one position per the second row of Table 1. Thus, after the step 52 rotation the bits in rotate circuit $40_0$ appear as:

| After rotate: | E | H | G | F |
|---|---|---|---|---|

Step 53 applies the second merge mask from Table 1. Note that the second merge mask is the complement of the corresponding first merge mask in each row in Table 1. Therefore, the second merge mask may be stored in a table in the same manner as the first merge mask, or may be created merely by using an inversion of the first merge mask. In any event, in the current example of the second row of Table 1, the second merge mask of M3:M0 is 1000, which in step 53 is applied to latches $42a_0$ through $42d_0$. Therefore, latch $42d_0$ latches the bit at its input while each of latches $42c_0$, $42b_0$, and $42a_0$ does not. Moreover, because of the earlier existing information in latches $42c_0$, $42b_0$, and $42a_0$, the combined merged information is:

| After mask: | F | D | C | B |
|---|---|---|---|---|

Step 54 writes the result from step 53 back to L2 cache 20. Thus, given the appropriate external addressing circuitry, the output from block move unit 24 is directed to a destination transfer unit in L2 cache 20. Moreover, one skilled in the art will therefore appreciate that the result following from the second mask operation set forth above caused information which originally was aligned beginning at S1 to now be aligned to S0.

Step 55 determines whether the transfer unit from step 54 represents the last transfer unit to be written to L2 cache 20. This step is preferably performed by some type of address comparison in execution stage 12a. If the last line is written, the flow continues to step 56 where method 44 is done. On the other hand, if the last line is not yet reached, method 44 continues to step 57.

Step 57 provides rotate circuit 40 with the information latched into transparent latch 38 in the preceding occurrence of step 50. Recall from above that the value latched into transparent latch 38 is currently HGFE. Next, the flow returns to repeat the above steps, starting with step 48. Thus, step 48 again rotates right the appropriate number of locations (one in the current example): Thus, after this occurrence of step 48, the bits in rotate circuit $40_0$ appear as:

| After rotate: | E | H | G | F |
|---|---|---|---|---|

From this point forward, method 44 remains in the loop until the last unit is written as detected by step 55. To complete the above example, and by way of summation, Table 2 immediately below shows the above transfer unit followed by an additional unit of LKJI.

TABLE 2

| Information location | Information | After step |
|---|---|---|
| provided through latch 38 to rotate circuit 40 | D C B A | 46 |
| after rotate circuit 40 | A D C B | 48 |
| latches 42d-a | — D C B | 50 (1) |
| in latch 38 and to rotate circuit 40 | H G F E | 50 (2) |
| after rotate circuit 40 | E H G F | 52 |
| latches 42d-a | E D G B | 53, 54 |
| provided through latch 38 to rotate circuit 40 | H G F E | 57 |
| after rotate circuit 40 | E H G F | 48 |
| latches 42d-a | — H G F | 50 (1) |
| in latch 38 and to rotate circuit 40 | L K J I | 50 (2) |
| after rotate circuit 40 | I L K J | 52 |
| latches 42d-a | I H G F | 53, 54 |

Having presented the above example, note further advantages of the present embodiments with respect to movement of information blocks greater than a single cache transfer unit. For example, the above presents the instance of a first transfer unit (e.g., beginning with DCBA) followed by a second transfer unit (e.g., beginning with HGFE). In the present embodiments, each of these transfer units corresponds to a 32 byte transfer unit and, therefore, the above demonstrates how the operations of block move unit 24 permit efficient movement and realignment of one 32 byte transfer unit from one location in L2 cache 20 to a different location in L2 cache 20. Thus, by virtue of its location between the output and input of L2 cache 20, and further having access to a 32 byte bus (i.e., bus 26), block move unit 24 is able to move an entire 32 byte transfer unit in only a few method steps. Note further, however, that the above process is repeatable for multiple transfer units. For example, if a total of 256 bytes were to be moved, then after the above example an additional seven transfer units may be processed in the same steps of method 44, and in each instance the application in one instance of a rotate and first merge mask is followed in another instance of a rotate and second complementary merge mask, thereby permitting an entire transfer unit to move from one location to another within L2 cache 20. Additionally, because steps 46 through the first operation of step 50 may occur at the same time as the second operation of step 50 through step 56, once the first transfer unit of a block is moved, each successive transfer unit may be moved in every other clock cycle. Thus, for large block moves, that is, those including multiple transfer units, many of those multiple transfer units may move very quickly, thereby providing considerable information movement with minimal burden on the remainder of the microprocessor.

As another alternative to the above embodiments, note that block move unit 24 may further operate to re-align to a destination address which is aligned to a storage area other than S0. Indeed, still additional embodiments may be constructed by a person skilled in the art to move blocks of data to destination addresses which are aligned to SA1, SA2, and SA3 as well. Toward this end, FIG. 6 below demonstrates such an example by way of illustration. Thus, given that example as well as the other descriptions set forth a person skilled in the art should be able to further modify the steps and merge masks used with the configuration of FIGS. 1 through 3 to permit movement of blocks of data for other alignments as well.

Figure 6:
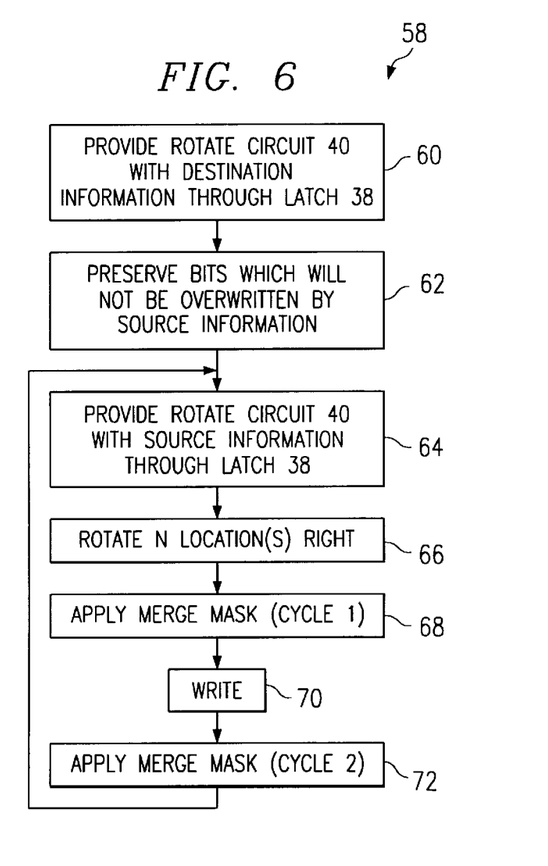
FIG. 6 illustrates a flowchart of the method steps for moving and re-aligning information from a source address aligned at the first of the four storage areas shown in FIG. 2 to a destination address aligned to the second of the four storage areas.

Turning then to FIG. 6, it illustrates a method designated generally at 58, and which depicts how the circuits of FIGS. 1 through 3 may operate to move a block of information from a source address which aligns to SA0 to a destination address which aligns to SA1. Step 60 provides a transfer unit through transparent latch $38_0$ to rotate circuit 40, but unlike step 46 of FIG. 5, the transfer unit of information of step 60 corresponds to the destination rather than the source. To demonstrate an example, therefore, assume that the destination group of received bits is as follows:

| Input: | 192 (S3) | 128 (S2) | 64 (S1) | 0 (SA0) |
|---|---|---|---|---|
| Bit received: | P | O | N | M |

Step 62 preserves the bit value(s) which are not to be overwritten by using a merge mask. To appreciate this, consider the present example where the destination aligns to S1. Since this is the case, all bits in the same sub-block but preceding that destination (i.e., lower in order) are not to be overwritten. Therefore, without rotation in step 62, a mask of MM3:MM0 equal to 0001 is applied to the above. Note that this merge mask also may be stored in a table in a manner such as that described above, and a person skilled in the art should be able to ascertain such a table for the present as well as additional examples given the teachings of this document. In any event, once the merge mask is determined, which again in the present example is 0001, it is applied and thereby leaves in latches $42d_0$ through $42a_0$ the following:

| After mask: | — | — | — | M |
|---|---|---|---|---|

Step 64 provides the first transfer unit from the source address sub-block through transparent latch $38_0$ to rotate circuit 40. Assume for the current example that the transfer unit is as follows:

| Input: | 192 (S3) | 128 (S2) | 64 (S1) | 0 (SA0) |
|---|---|---|---|---|
| Bit received: | D | C | B | A |

Step 66 right rotates the transfer unit received in step 64 the number of appropriate locations and, in the current example, that number is three. This rotation yields:

| After rotate: | C | B | A | D |
|---|---|---|---|---|

Step 68 applies a merge mask to the rotated value from step 66 to merge certain rotated bits from step 66 which are not masked with certain bits already in latches 42$d_0$ through 42$a$. In the current example, a merge mask value of MM3:MM0 equal to 1110 is applied to perform step 68, thereby resulting in the following output from latches 42$d_0$ through 42$a_0$:

| After mask: | C | B | A | M |
|---|---|---|---|---|

Step 70 writes the value in latches 42$d_0$ through 42$a_0$ to the destination. At this point, therefore, one skilled in the art will appreciate that a transfer unit which was aligned to SA0 has been re-aligned to SA1.

Step 72 applies an additional merge mask which is the complement of the merge mask used in step 68. As a result, those rotated bits which were not permitted to reach latches 42$d_0$ through 42$a_0$ in step 68 (due to masking) are now latched into latches 42$d_0$ through 42$a_0$. Specifically, in the current example, step 72 applies a merge mask of MM3:MM0 equal to 0001. Since the value of CBAD is still available at the output of rotate circuit 40$_0$, then this additional merge mask causes the following value at the output of latches 42$d_0$ through 42$a_0$:

| After mask: | — | — | — | D |
|---|---|---|---|---|

Next, the flow returns to step 64 and the remainder of the method repeats for each additional move until the last transfer unit of the block to be moved is encountered. To demonstrate the next successive transfer unit, note therefore that the repetition of step 64 loads the following into transparent latch 38$_0$:

| Input: | 192 (S3) | 128 (S2) | 64 (S1) | 0 (SA0) |
|---|---|---|---|---|
| Bit received: | H | G | F | E |

Next, a repetition of the three right rotations of step 66 leaves in rotate circuit 40$_0$:

| After rotate: | G | F | E | H |
|---|---|---|---|---|

Next, a repetition of the merge mask of MM3:MM0 equal to 1110 of step 68 is applied, so the output of latches 42$d_0$ through 42$a_0$ provide the value of:

| After mask: | G | F | F | D |
|---|---|---|---|---|

And finally, this value is written via a repetition of step 70 to the destination, again with the process continuing through step 72 and repeating in its entirety for each successive transfer unit of the block to be moved. Lastly, although not shown, one skilled in the art will appreciate that the last transfer unit of the block in the current example should only overwrite to SA0, with the remaining information in SA1 through SA3 not being overwritten by that transfer unit; accordingly, again, the destination may be read before performing this final write and merge masking may be used to accomplish this result.

Figure 7:
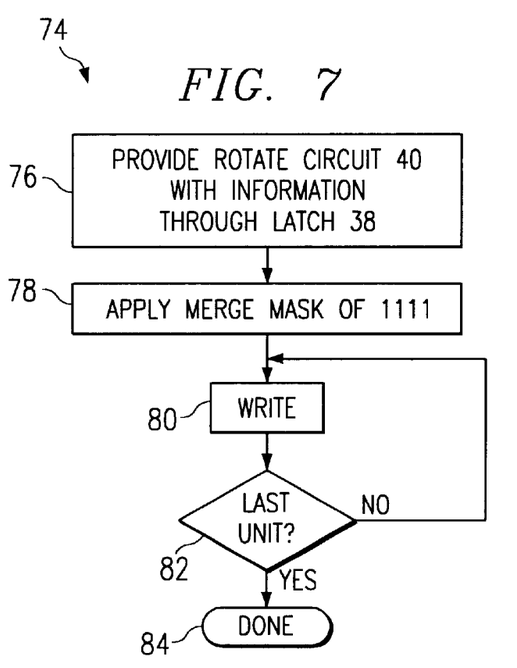
FIG. 7 illustrates a flowchart of the method steps for moving a pattern of information to a destination address.

While the above demonstrates block movement of information from a source within L2 cache 20 to a destination within L2 cache 20, FIG. 7 illustrates a method designated generally at 74 and which is operable, as another aspect of the present embodiments, to move blocks of a pattern into an area of memory, such as a page clear or the like, and assuming an aligned boundary such as in the page instance mentioned immediately above. Method 74 commences with step 76, which provides a pattern through each transparent latch 38 into each corresponding rotate circuit 40 within block move unit 24. This pattern may be all binary zeroes, all binary ones, or any other desired pattern. In the instance where loading all zeroes is desired, rotate circuit 40 (or the preceding transparent latch 38) may be equipped with some type of control input which merely clears its contents, thereby effectively loading zeroes into each rotate circuit 40. In alternative embodiments, each rotate circuit 40 may be loaded by other devices having access to bus 22. Indeed, the desired pattern may first be stored in a single transfer unit in L2 cache 20 and then read by each transparent latch 38. In any event, once each transparent latch 38 is loaded with the preferable pattern, step 78 applies a merge mask value of 1111. This merge mask, however, merely transfers the value from rotate circuit 40 directly to the corresponding latches 42$a_0$ through 42$d_0$. Next, step 80 writes the entire transfer unit of the pattern to a destination in L2 cache 20. Again, therefore, there is the ability to write 32 bytes at a time in this manner, or whatever the width of the bus is connecting block move unit 24 to its receiving cache. Step 82 determines whether the transfer unit from step 80 represents the last transfer unit to be written to L2 cache 20. This step is preferably performed by some type of address comparison in execution stage 12$a$. For example, a counter may count lines provided both the instruction commencing the sequence provides a starting and finishing address, or a starting address and a length of the number of transfer units to be moved. In any event, if the last line is written, the flow continues to step 84 where method 74 is done. On the other hand, if the last line is not yet reached, method 74 returns to step 80. Note, therefore, that on the second and subsequent occurrences of step 80 that the pattern need not be re-loaded or re-masked but, instead, for each subsequent single write cycle may be stored as the next successive transfer unit into L2 cache 20. Thus, page clears or other types of block operations may occur in an efficient manner. Lastly, in addition to the above, note also that a person skilled in the art could further modify the above if it is desirable to clear a mis-aligned memory area by additionally using the rotate and masking features discussed above.

Figure 8:
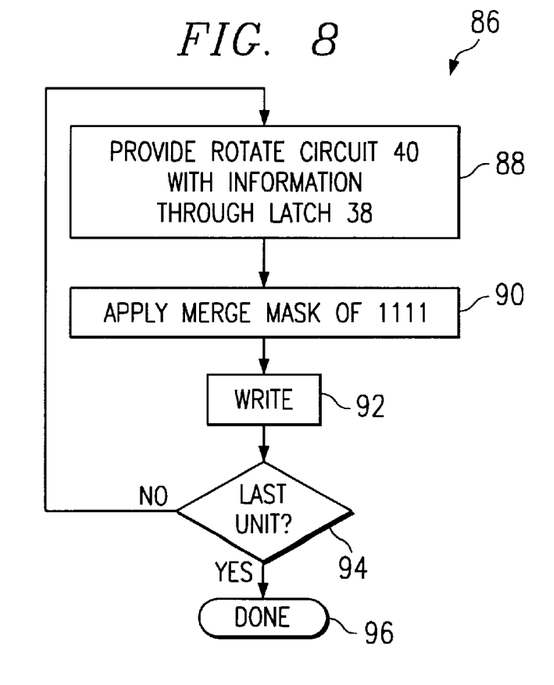
FIG. 8 illustrates a flowchart of the method steps for moving information from a source address aligned at one of the four storage areas shown in FIG. 2 to a destination address aligned to the same of the four storage areas.

FIG. 8 illustrates yet another alternative operational method designated generally at 86, and which demonstrates how the circuit embodiments set forth may copy information from a source address to a destination address, where the source and destination address are aligned with one another. Turning then to method 86, it commences with step 88 which provides a transfer unit from the source address through each transparent latch 38 into each corresponding rotate circuit 40. Here, because the source and destination are aligned, no rotation is necessary. Therefore, the next step occurs without rotation and is step 90. Step 90 applies a merge mask value of 1111. This merge mask transfers the value from rotate circuit 40 directly to the corresponding latches $42a_0$ through $42d_0$. Next, step 92 writes the entire transfer unit of the pattern to a destination in L2 cache 20. Again, therefore, there is the ability to write 32 bytes at a time in this manner, or whatever the width of the bus is connecting block move unit 24 to its receiving cache. Step 94 determines whether the transfer unit from step 80 represents the last transfer unit to be written to L2 cache 20. Like step 82 of FIG. 7, step 94 may be performed by some type of address comparison in execution stage 12a. If the last line is written, the flow continues to step 96 where method 86 is done. On the other hand, if the last line is not yet reached, method 86 returns to step 76. Note, therefore, that on the second and subsequent occurrences of step 80 that each successive transfer unit is loaded and then processed in the same manner. Moreover, because no rotation and merging is required, each successive transfer unit may be written in a successive cycle so that 32 bytes are written for each single subsequent write cycle. Thus, information aligned at the same source and destination boundary also may be moved (or copied) in an efficient manner.

Given the above discussion, the present embodiments provide numerous advantages over the prior art. For example, a system is provided which may be implemented on a single integrated circuit microprocessor. As another example, the circuitry of FIG. 3 avoids much of the complexity and additional resources needed by separate autonomous block moving circuitry. Indeed, given a cache such as L2 cache 20 with a 256 bit output, the circuitry of FIG. 3 may be implemented using relatively little hardware. Indeed, from a layout standpoint, since the circuitry of FIG. 3 requires only seven control signals, these signals may be implemented with only seven signal leads traversing the other lines required to implement the circuit. Moreover, often a cache which benefits from the above move unit will output a significant number of bits (e.g., 256 above) and, therefore, layout requirements will already provide a given area between the cache and any other circuit. As a result of the few hardware requirements to implement the above circuit, it may be placed in this area and, therefore, provide the described functionality without increasing the area requirements at all. As another example, the present embodiments provide block movement capability where a transfer unit at a time may be moved, at that line is considerably larger than the bus baseline of the microprocessor. Still other advantages will be appreciated by a person skilled in the art, and are still further recognizable given the following example of a microprocessor which may implement the above.

The present embodiments further contemplate various considerations with respect to any cache lower in hierarchy than that which is associated with block move unit 24. For example, the above descriptions set forth various examples of moving information to a destination in L2 cache 20. As shown in FIG. 1, however, L1 cache 16 is lower in hierarchy than L2 cache 20. First, in this context note yet another benefit of the present embodiments. Specifically, because block moves occur only at a higher level cache (e.g., L2 cache 20), lower level caches (e.g., L1 cache 16) are only in some instances slightly burdened by this movement of data as demonstrated below; in contrast, if a prior art system were used which burdened the lower level cache, a large move could effectively overwrite much if not all of the information in the lower cache, thereby causing a loss in useful capacity in the lower level cache. Second, however, movement of information in association with a higher level cache raises issue of information coherency, and these issues are further addressed immediately below.

Given the present embodiments, and returning to FIG. 1, note now that the CONTROL signal provided by execution stage 12a to block move unit 24 is also connected to L1 cache 16. This connection permits L1 cache 16 to ensure proper information coherency as block move unit 24 operates. The concept of maintaining coherency in multi-level memory systems, or "snooping" as referred to in the art, is well known. Snooping ensures that any information in the L2 cache is not changed without regard for the possibility that same addressable information is also stored in the L1 cache. In other words, if the L1 cache also stores a dirty copy of the information to be changed in the L2 cache (i.e., the same addressable information), then it is necessary to ensure either that the L1 cache information is invalidated or possibly even used to update the corresponding L2 cache information before it is changed (with the choice being dictated upon particular circumstances). Given the necessity for snooping multi-level memory systems already include sufficient circuitry including address and control lines between the memory portions to enable snooping. For example, as between an L1 and L2 cache, the L1 cache is snooped when some entity accesses the L2 cache without having first caused a cache miss in the L1 cache. Therefore, in this context, the present embodiments may include additional control signals to use these snooping resources if a transaction by block move unit 24 is to take place with respect to either a source or destination address in L2 cache 20 which is also stored in L1 cache 16. Specifically, the present embodiments then provide sufficient control to ensure that, after the transaction, the only valid copy of the information remains in L2 cache 20. As one example of such a coherency technique, as each transfer unit is addressed as a source to be moved, the present embodiments determine whether L1 cache 16 also stores a dirty copy of that transfer unit. If a negative determination is made, no other action is taken with respect to L1 cache 16. On the other hand, if is determined that L1 cache 16 stores a dirty copy of the transfer unit, that copy is then written from L1 cache 16 to L2 cache 20. Thereafter, the transfer unit may be moved from L2 cache 20 by block move unit 24 in any of the manners as described above. Indeed, recall from above that for moving transfer units to un-aligned addresses, the first and last destinations are read and merged with the source information. Thus, if L1 cache 16 includes a copy of this destination information, the present embodiments also ensure that they too are copied to L2 cache 20 before the same address is read from L2 cache 20 by block move unit 24. As another example of a coherency technique, as each destination address in L2 cache 20 is issued, the present embodiments determine whether that destination address is also located in L1 cache. If a negative determination is made, no other action is taken with respect to L1 cache 16. On the other hand, if it is determined that the destination address is also located in L1 cache 16, then the information in L1 cache 16 at the destination address is invalidated; thus, once the transfer unit is thereafter written to L2 cache 20, the earlier information in L1 cache 16 corresponding to the same address will not be used since it is designated as invalid, regardless of it being dirty as a full block write will have been done.

Having described the above embodiments, FIG. 9 illustrates a block diagram of a microprocessor embodiment into which the above embodiments may be incorporated. FIG. 9 depicts an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 110, as shown in FIG. 9, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 9 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 9, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114. Of course, microprocessor 110 may also effect bus traffic around level 2 cache 114, by treating certain bus reads and writes as "not cacheable". Level 2 cache 114, as shown in FIG. 9, is connected to two level 1 caches 116; level 1 data cache $116_d$ is dedicated to data, while level 1 instruction cache $116_i$ is dedicated to instructions. Power consumption by microprocessor 110 is minimized by accessing level 2 cache 114 only in the event of cache misses of the appropriate one of the level 1 caches 116. Furthermore, on the data side, microcache 118 is provided as a level 0 cache, which in this example is a fully dual-ported cache.

Given the various levels of cache set forth immediately above, note further that microprocessor 110 may include a block move unit as described above. Thus, FIG. 9 further includes a block move unit 24 connected bi-directionally connected to level 2 cache 114. Thus, level 2 cache 114 may be read, and written to, by block move unit 24 in the manners described above. Moreover, although not shown so as not to further complicate FIG. 9, each load store unit (described below as part of the execution stage) also provides the above-described CONTROL signal to the level 1 caches as well as to block move unit 24. From the above description of FIG. 1 through 8, therefore, one skilled in the art will appreciate the operation of these components in connection with FIG. 9.

As shown in FIG. 9 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_2$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139 as well as providing the above-mentioned CONTROL signals to block move units 24a and 24b, as well as to the level 1 caches $116_d$ and $116_i$. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register and/ or memory operands indicated by the AOps |
| EX | Execute: This stage runs the execution units according to the AOps and the retrieved operands |
| WB | Write back: This stage stores the results of the execution in registers or in memory |

Referring back to FIG. 9, the pipeline stages noted above are performed by various functional blocks within microprocessor 110. Fetch unit 126 generates instruction addresses from the instruction pointer, by way of instruction micro-translation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution. As indicated in FIG. 9, operand unit 144 receives an input from scheduler 136 and also from microcode ROM 148, via multiplexer 145, and fetches register operands, and/or memory operands via load/store units $140_0$ and or $140_1$, for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 9, as well as the descriptions above such as those relating to the prior Figures, one skilled in the art may appreciate that system 34 of FIG. 2 may be incorporated in connection with various components shown in FIG. 9. For example, the writeback stage described above may be achieved by issuance of data from any of the five execution units of microprocessor 10 (two load-store units $140_0$, $140_1$, two ALUs $142_0$, $142_2$, and an FPU 130). As another example, any of the various caches shown in FIG. 9 may evict data to a combined storage queue such as queue 16 described above. Still further, various related functionality may be further performed by the appropriate circuitry within FIG. 9.

From the above, one skilled in art may appreciate numerous benefits of the present embodiments. For example, a microprocessor in accordance with the various embodiments may move a block of information by moving up to 32 bytes at a time. As another benefit, note that often information to be moved on page boundaries is aligned and, therefore, the above techniques are readily applicable to such instances. As still another example, even information not on page boundaries may still be aligned on a storage area boundary and, therefore, also may benefit from the above. Still further advantages of the present system have been stated above, which also demonstrate various alternative embodiments included within the inventive scope. Still other examples will be ascertainable by a person skilled in the art. For example, while block move unit 24 is shown between the L1 and L2 caches, it could be placed between other caches as well. In this regard, if a block move unit is connected to a different cache such as one which is 64 bytes (or larger) wide, then the corresponding block move unit would then operate to move up to 64 bytes in a single write cycle. As another example, in a system with multiple cache units, multiple block move units could be implemented, with each having the bandwidth to move a line of information at a time, where the length of that line is defined by the cache from which the unit is receiving and writing information. As still another example, while the L2 cache described above includes four storage areas, an alternative integer number of storage areas could be included, with each circuit built in the manner of FIG. 3 being adjusted to include the a number of inputs equal to the integer number of storage areas. As still another example of the flexibility of the present embodiments, one skilled in the art is able to construct various different specific circuits to accomplish the above features and functionality. As yet another example, while the microprocessor of FIG. 7 depicts an exemplary microprocessor to benefit from the inventive embodiments, other microprocessor architectures could benefit as well. Indeed, these benefits and examples serve further to demonstrate that while the present embodiments have been described in detail, various substitutions, modifications or alterations could be made to the descriptions set forth above without departing from the inventive scope. Still further, in addition to the many options set forth above still other alternatives will be ascertainable by a person skilled in the art, and all of the above demonstrates the flexibility of the inventive scope which is defined by the following claims.

What is claimed is:

1. A single integrated circuit microprocessor, comprising:
   an instruction pipeline, wherein said instruction pipeline comprises an execution stage operable to process a an information unit of a first length;
   a cache circuit comprising a memory operable to store a transfer unit of information of a second length and accessible by said instruction pipeline, wherein said second length is greater than said first length;
   a block move circuit coupled to said cache circuit and operable to read/write a transfer unit of information of said second length into said memory of said second cache circuit;
   wherein said memory of said cache circuit comprises a number of storage areas, wherein each of said storage areas comprises a set of outputs, and wherein a set of outputs for each of said storage areas is physically ordered in an integer number of interleaved positions with respect to said sets of outputs of all other of said storage areas; and
   wherein said block move circuit comprises a plurality of rotate circuits; and wherein each of said plurality of rotate circuits is operable to receive and rotate a number of bits equal to said integer number.

2. The single integrated circuit microprocessor of claim 1:
wherein each of said plurality of rotate circuits has a number of outputs equal to said integer number; and
wherein each of said number of outputs is connected to a corresponding latching circuit.

3. The single integrated circuit microprocessor of claim 2 wherein, responsive to control signals, said rotate circuits and said latching circuit are operable to re-align a transfer unit of information received from a source address aligned at a first of said storage areas to a destination address corresponding to a second of said storage areas.

4. A single integrated circuit microprocessor, comprising:
an instruction pipeline, wherein said instruction pipeline comprises an execution stage operable to process a an information unit of a first length;
a cache circuit comprising a memory operable to store a transfer unit of information of a second length and accessible by said instruction pipeline, wherein said second length is greater than said first length;
a block move circuit coupled to said cache circuit and operable to read/write a transfer unit of information of said second length into said memory of said second cache circuit;
wherein said cache circuit comprises a first cache circuit;
further comprising a second cache circuit accessible by said instruction pipeline, wherein said first cache circuit is accessed in response to a miss in said second cache circuit; and
wherein a transfer unit of information to be read and written by said block move circuit has a corresponding address;
and further comprising:
determining circuitry for determining whether said second cache stores a dirty copy of said transfer unit of information to be read and written by said block move circuit at said corresponding address prior to said block move circuit reading said transfer unit of information; and
circuitry for writing said transfer unit of information from said second cache circuit to said first cache circuit prior to said block move circuit writing said transfer unit of information in response to said determining circuitry determining that said second cache stores a dirty copy of said transfer unit of information.

5. A single integrated circuit microprocessor, comprising:
an instruction pipeline, wherein said instruction pipeline comprises an execution stage operable to process an information unit of a first length;
a first cache circuit comprising a memory operable to store a transfer unit of information of a second length and accessible by said instruction pipeline, wherein said second length is greater than said first length;
a second cache circuit accessible by said instruction pipeline, wherein said first cache circuit is accessed in response to a miss in said second cache circuit;
a block move circuit coupled to said cache circuit and operable to read/write a transfer unit of information of said second length into said memory of said second cache circuit;
wherein said memory of said cache circuit comprises a number of storage areas, wherein each of said storage areas comprises a set of outputs, and wherein a set of outputs for each of said storage areas is physically ordered in an integer number of interleaved positions with respect to said sets of outputs of all other of said storage areas; and
wherein said block move circuit comprises a plurality of rotate circuits; and
wherein each of said plurality of rotate circuits is operable to receive and rotate a number of bits equal to said integer number.

6. The single integrated circuit microprocessor of claim 5:
wherein each of said plurality of rotate circuits has a number of outputs equal to said integer number; and
wherein each of said number of outputs is connected to a corresponding latching circuit.

7. A single integrated circuit microprocessor, comprising:
an instruction pipeline, wherein said instruction pipeline comprises an execution stage operable to process an information unit of a first length;
a first cache circuit comprising a memory operable to store a transfer unit of information of a second length and accessible by said instruction pipeline, wherein said second length is greater than said first length;
a second cache circuit accessible by said instruction pipeline, wherein said first cache circuit is accessed in response to a miss in said second cache circuit;
a block move circuit coupled to said cache circuit and operable to read/write a transfer unit of information of said second length into said memory of said second cache circuit;
wherein said memory of said cache circuit comprises a number of storage areas, wherein each of said storage areas comprises a set of outputs, and wherein a set of outputs for each of said storage areas is physically ordered in an integer number of interleaved positions with respect to said sets of outputs of all other of said storage areas; and
wherein a transfer unit of information to be read and written by said block move circuit has a corresponding address;
and further comprising:
determining circuitry for determining whether said second cache stores a dirty copy of said transfer unit of information to be read and written by said block move circuit at said corresponding address prior to said block move circuit reading said transfer unit of information; and
circuitry for writing said transfer unit of information from said second cache circuit to said first cache circuit prior to said block move circuit writing said transfer unit of information in response to said determining circuitry determining that said second cache stores a dirty copy of said transfer unit of information.

8. A single integrated circuit microprocessor, comprising:
an instruction pipeline, wherein said instruction pipeline comprises an execution stage operable to process an information unit of a first length;
a first cache circuit comprising a memory operable to store a transfer unit of information of a second length and accessible by said instruction pipeline, wherein said second length is greater than said first length;
a second cache circuit accessible by said instruction pipeline, wherein said first cache circuit is accessed in response to a miss in said second cache circuit;

a block move circuit coupled to said cache circuit and operable to read/write a transfer unit of information of said second length into said memory of said second cache circuit;

wherein said memory of said cache circuit comprises a number of storage areas, wherein each of said storage areas comprises a set of outputs, and wherein a set of outputs for each of said storage areas is physically ordered in an integer number of interleaved positions with respect to said sets of outputs of all other of said storage areas; and wherein a transfer unit of information to be read and written by said block move circuit has a corresponding address;

and further comprising:
  determining circuitry for determining whether said second cache stores a copy of said transfer unit of information to be written by said block move circuit at said corresponding address; and
  circuitry for invalidating said copy of said transfer unit of information at said corresponding address prior to said block move circuit writing said transfer unit of information in response to said determining circuitry determining that said second cache stores a copy of said transfer unit of information at said corresponding address.

9. A single integrated circuit microprocessor, comprising:

an instruction pipeline, wherein said instruction pipeline comprises an execution stage operable to process an information unit of a first length;

a cache circuit comprising a memory operable to store a transfer unit of information of a second length and accessible by said instruction pipeline, wherein said second length is greater than said first length;

a block move circuit coupled to said cache circuit and operable to read/write a transfer unit of information of said second length into said memory of said second cache circuit;

wherein said memory of said cache circuit comprises a number of storage areas, wherein each of said storage areas comprises a set of outputs, and wherein a set of outputs for each of said storage areas is physically ordered in an integer number of interleaved positions with respect to said sets of outputs of all other of said storage areas, such that the number of storage areas defines the number of bits output as a group, wherein said group comprises a single bit from each of said storage areas and wherein further said second length divided by said number of storage areas defines the number of groups of bits in a single write cycle; and wherein further said groups of bits output in a single write cycle represent one transfer unit of information and are processed simultaneously and according to the steps of:

rotating said bits in each of said groups from zero to said integer number of bit positions right, via a rotate circuit, in response to a rotate control signal from said execution stage;

latching said rotated bits or passing said rotated bits through in a particular pattern in response to a merge mask signal from said execution stage;

providing a next group of bits representing the next addressed transfer unit of information to a second latch circuit for latching said bits in response to a second control signal from said execution stage;

rotating said next group of latched bits the same number of bit positions as said previously group of bits, via said rotate circuit;

latching said rotated bits of passing said rotated bits through in exactly the inverse of said particular pattern; and writing said bits remaining in said latches post said latching and passing through into said cache circuit.

10. The single integrated microprocessor according to claim 9, wherein said integer number is four.

11. The single integrated microprocessor according to claim 9, wherein latching said rotated bits or passing said rotated bits through in a particular pattern and;

providing a next group of bits representing the next addressed transfer unit of information to a second latch circuit may be done simultaneously.

* * * * *

UNITED STATES PATENT AND TRADEMARK OFFICE
CERTIFICATE OF CORRECTION

PATENT NO. : 6,212,601 B1
DATED : April 3, 2001
INVENTOR(S) : Jonathan H. Shiell Page 1 of 1

It is certified that error appears in the above-identified patent and that said Letters Patent is hereby corrected as shown below:

<u>Title page,</u>
Insert Item [60], under Related U.S. Application Data
-- Provisional Application No. 60/024,918 August 30, 1996. --

Signed and Sealed this

First Day of January, 2002

Attest:

JAMES E. ROGAN
*Attesting Officer*     *Director of the United States Patent and Trademark Office*